LOW NOISE, MULTIPLE MIXER SYSTEM

Filed July 18, 1960

INVENTOR.
AMASA PRATT
BY
Earl C. Hancock
AGENT

United States Patent Office 3,159,790
Patented Dec. 1, 1964

3,159,790

LOW NOISE, MULTIPLE MIXER SYSTEM

Amasa Pratt, Towson, Md., assignor to Martin-Marietta Corporation, a corporation of Maryland
Filed July 18, 1960, Ser. No. 43,646
3 Claims. (Cl. 325—449)

Figure 1:
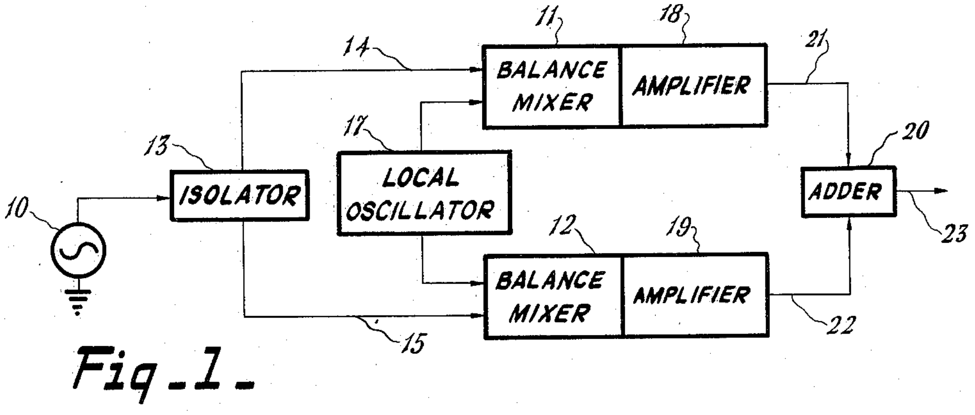

This invention relates to low-level signal handling apparatus capable of utilizing signals of an amplitude approaching that of the noise level present at the apparatus. More particularly, this invention relates to receiving apparatus capable of handling signals received at a lower magnitude of power than previously known apparatus by employing correlation techniques and a multiplicity of low-level stages to produce an output signal having a larger amplitude than the noise introduced randomly in the system.

The factors that most seriously limit the usable range of radar and communications receiving systems have been found to be the random noise signals present in the atmosphere and in the low-level receiver stages. The present state of the art indicates that the noise generated in the low-level receiver stages is the most significant between the two afore-mentioned factors especially in microwave systems and therefore several approaches have been employed to reduce the limiting effects of receiver noise. One of these approaches involves the development of new types of low-level amplifier stages such as masers and parametric amplifiers by means of which considerable improvements in signal-to-noise ratios have been realized. However, some typical disadvantages that must be accepted or overcome in utilizing masers and parametric amplifiers are the need for refrigeration equipment for the former, the complexity and relative instability of the latter, and the requirement for both of these amplifiers of "pump" oscillator signals at frequencies above the received signal frequencies which presents problems of considerable consequence in microwave equipment.

By the present invention, a receiver system is provided wherein the noise added to the received signals in the low-level stages is markedly reduced. In particular, the present invention provides a receiver having two or more parallel low-level channels with the output signals thereof vectorially added together in an adding network which advantageously correlates the signals related to the received signals so that they will be produced at the output with greater amplitude than the uncorrelated random signals introduced in the low-level stages. A common receiving antenna is employed and by this means the received signal can be correlated after it has been reduced in frequency to an intermediate frequency and amplified in each of the parallel channels. However, the noise introduced in any one of these channels is generally completely random and will not be capable of being directly added in the adding network since this noise is uncorrelated. In practice it has been found that the diodes employed in microwave mixers are a particularly bothersome noise generator but by the use of as few as two parallel channels in accordance with the present invention, the effect of this noise is reduced by producing a correlated output signal having a relative value of 3 db over the noise level thus increasing the usable range of a radar or communications system. In addition, the loss of all but one of the parellel channels of the present invention would still leave a receiving system capable of continued operation.

Figure 2:
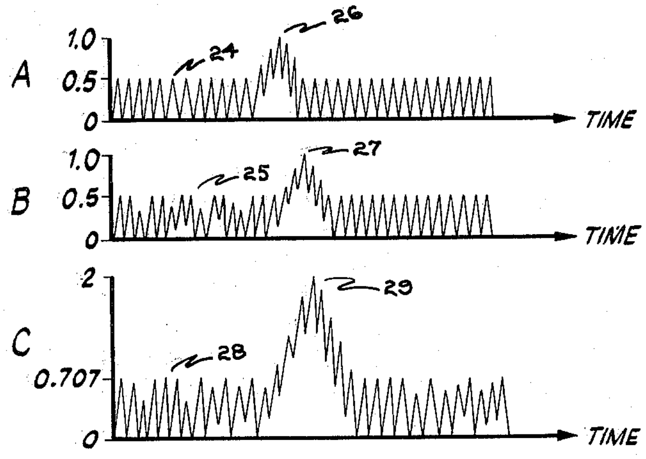
Figure 3:
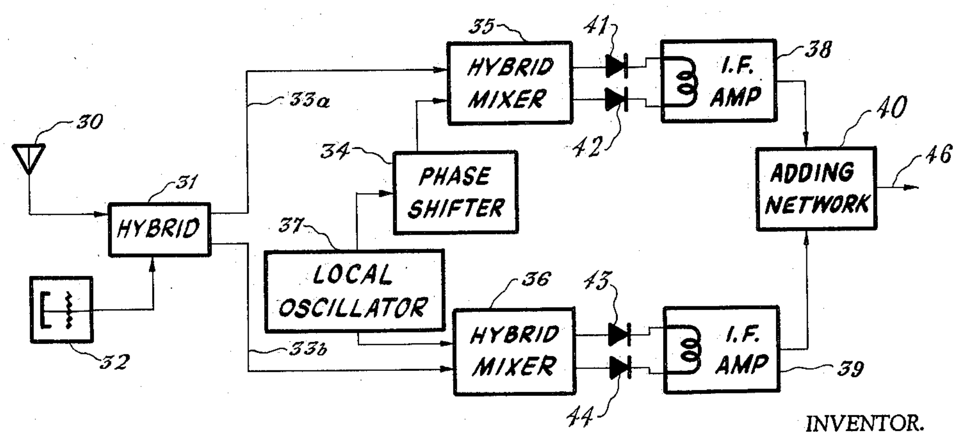

The novel features that are considered characteristic of this invention are set forth with particularity in the appended claims. The invention itself, however, both as to its organization and method of operation as well as additional features and advantages thereof will be best understood from the following description when read in connection with the accompanying drawings in which:

FIGURE 1 is a block diagram of a low-level signal handling system in accordance with this invention; and FIGURE 2 is a series of idealized time-base diagrams taken at various points in FIGURE 1; and FIGURE 3 illustrates a typical microwave receiving system embodying this invention.

FIGURE 1 shows a source of input signals 10 which feeds a common signal into isolator 13 which in turn splits this common signal between lines 14 and 15. The signals at lines 14 and 15 are then introduced to balanced mixers 11 and 12 respectively, the presence of isolator 13 being primarily to prevent any feedback present at one of the mixers from being sensed by the other mixer. Balanced mixers 11 and 12 additionally receive a common signal from local oscillator 17 which of course reduces the input signals to lower intermediate-frequency signals in these mixers. It should be noted here that the spurious noise generated in the local oscillator will be substantially eliminated in the balanced mixers as is well know in the art. After amplication in amplifiers 18 and 19, the two intermediate-frequency signals produced by mixers 11 and 12 are introduced by means of lines 21 and 22 to adder circuit 20 so as to be added vectorially therein. The uncorrelated random noise introduced by mixers 11 and 12 and amplifiers 18 and 19 will then appear at output 23 as increased in amplitude by a factor of the square root of two ($\sqrt{2}$) but the intermediate-frequency signals introduced to adder 20 will be doubled in magnitude since these signals are correlated and thus a gain of 3 db can be realized with respect to the noise level.

The foregoing system operation may best be visualized by referring to FIGURE 2 in which an idealized exemplary operation of the system shown in FIGURE 1 is graphically illustrated. In particular, curves A and B in FIGURE 2 show a typical signal that might be present at 21 and 22 in FIGURE 1 respectively, and curve C represents the signal that would appear at output lead 23 as a result of the vectorial combining of the signals represented by curves A and B in adder circuit 20. The noise generated in the mixer and amplifier circuitry is shown at 24 and 25 as having an average peak value of half of a unit while the intelligence signals 26 and 27 as generated by signal source 10 (here shown as a pulse for purposes of illustration although the invention is obviously not so limited) are shown as having an amplitude of one unit. Since the noise signals are not correlated, the adder circuit 20 will have an output noise that is equal in magnitude to the square root of two times the amplitude of one of the average noise peaks or .707 unit, but the correlated input signals 26 and 27 will appear with the sum of their respective amplitudes which is two units in amplitude as shown by signal 29. Thus 3 db of detectable signal has been realized over the noise level. It is to be realized that further reduction of noise can be gained by cascading additional mixers and/or amplifiers in each of the parallel channels.

As used in this specification and especially in conjunction with the description of FIGURE 3 hereinafter, the terms hybrid section or hybrid network are intended to mean a four-terminal pair network having two input terminal and two output terminal pairs and being designed so that, provided the terminal pairs are matched, the power introduced to either of the input terminals pairs will be divided between the two output terminal pairs but will not be reflected into the other input terminals. Conversely, any feedback signals present at one of the output terminal pairs will not be reflected into the other output terminal pair but will be divided between the two input terminals. Some examples of this type of network are the short slot waveguide section, the "magic-T," and the two-way amplifiers developed for communications work. A typical example of a "magic-T" section is the MA-637 model made by the Microwave Associates, Inc., of Burlington, Massachusetts.

A typical microwave receiver system embodying the present invention is shown in FIGURE 3. In this system received signals are picked up by antenna 30 and fed into one of the output terminals of hybrid waveguide section 31 in which the other input terminal pair is terminated at 32 and which splits the received signals between lines 33A and 33B. Lines 33A and 33B then introduce the received signals into hybrid mixers 35 and 36 respectively. Mixers 35 and 36 also receive frequency reducing signals from local oscillator 37 although the local oscillator signals for mixer 35 pass through phase shifter 34, the purpose of which is to compensate for differences in path length through the two parallel channels. It is to be understood, of course, that the phase shifter could be placed between mixer 36 and local oscillator 37 or in line 33A or 33B or any combination of these. If the electrical path lengths of the two parallel channels are equal or nearly equal, then phase shifter 34 could be omitted entirely.

The combining of the local oscillator signals with the received signals in mixers 35 and 36 will produce intermediate-frequency signals of course, and these signals are coupled into amplifiers 38 and 39 by means of diodes 41, 42, 43 and 44. As mentioned hereinbefore, a relatively large amount of the internal system noise is generated by these diodes but the noise generated by any one diode is not generally correlated to the noise generated in any other diode. Therefore, the coupling of the output signals from amplifiers 38 and 39 into adding network 40 will result in an output signal at terminal 46 in which the signals related to the signals received by antenna 30 will have gained 3 db of detectable signal with respect to the noise level.

The foregoing description was verified by a laboratory experiment in which the signal source was a Hewlett-Packard 626A signal generator and a Hewlett-Packard X382A variable attenuator, the phase shifter was a Hewlett-Packard model No. X885A, the balanced mixers were short slot waveguide networks made by Microwave Development Laboratories (Wellesley, Massachusetts), using 1N23E crystals, the local oscillator was a Microwave Development Lab X-band generator, and the adding network was a transformer designed to add signals by an in-phase relation at the desired frequencies and by an out-of-phase relation at other frequencies. The output of the adder network was then observed on an oscilloscope. By this arrangement, it was found that the minimum detectable signal when either channel was in operation (but not both channels) was 97 dbm whereas the minimum detectable signal when both channels were in operation was 100 dbm thus verifying the practicability of the present invention.

In fact, the aforementioned experimental system with only one channel in operation was set so that the signal presentation was barely discernable over the noise level on the oscilloscope, and then the other channel was turned on. The desired signal immediately became quite prominent and easily recognizable since it did increase in amplitude with respect to the noise level by 2 to 3 db. In addition, the phase shifter was varied through a full 360° of phase shift, and it was found that the amount of correlation could thereby be controlled from a maximum to a minimum for every 180° of phase shift therebetween. The phase shifter had no effect upon the single channel operation, of course.

It should now be obvious that by this invention not only is the minimum detectable signal strength of a receiving system improved but reliability is also increased.

More particularly, the loss of any one channel during the operation of this system will not render the system inoperative since the other channel will continue to function although a loss of detectable signal strength of 6 db would be experienced, 3 db from the splitting of the power at the antenna and 3 db from the loss of the correlation process.

Although this invention has been shown and described herein with particularity, it is to be understood that the invention is not limited to the exact form or use indicated and that variations may be made in the design and configuration of a particular system without departing from the scope and spirit of this invention. For instance, more than one parallel channel could be included with the output signals thereof sequentially added by several adding networks, and the mixer diodes could be used in the series type of connection as is well known in the art in place of the back-to-back configuration shown in FIGURE 3.

What is claimed is:

1. An improved low-level signal handling portion of a receiving system comprising an antenna, isolator means connected to receive output signals from said antenna and to divide the power thereof between at least one pair of output connections, said isolator means being designed to prevent feedback signals between said output connections, at least one pair of balanced mixers each including a hybrid waveguide section having a pair of unidirectional conducting devices connected in opposed phase relation in the output section thereof, means for coupling signals present at said output connections to a respective one of said balanced mixers, a local oscillator coupled for introducing signals into said balanced mixers for producing intermediate-frequency signals, a plurality of connecting means each coupled to receive intermediate-frequency signals from the output section of a respective one of said balanced mixers, and at least one adding network coupled to receive the intermediate-frequency signals from said connecting means so as to employ correlation to produce output signals containing intermediate-frequency signals of a larger amplitude than signals resulting from random noise introduced internally into said system.

2. An improved receiving system in accordance with claim 1 in which the coupling of said local oscillator and at least one of said mixers includes an adjustable phase shifting means for shifting the phase of the signals introduced therebetween whereby differences in electrical path lengths between said antenna and said adding network can be compensated for by adjusting said phase shifting means.

3. An improved receiving system in accordance with claim 1 in which said isolator means is a hybrid waveguide section.

References Cited by the Examiner

UNITED STATES PATENTS

| | | | |
|---|---|---|---|
| 2,175,270 | 10/39 | Koch | 325—156 X |
| 2,679,582 | 5/54 | Edwards | 325—446 |
| 2,772,350 | 11/56 | Deardor | 325—435 |
| 2,813,974 | 11/57 | Keal | 325—474 X |
| 2,828,411 | 3/58 | Beardwood et al. | 324—435 |
| 2,909,655 | 10/59 | Sanner | 324—446 |
| 2,946,884 | 7/60 | Mraz | 325—449 |
| 2,957,953 | 10/60 | Woodward | 179—100.2 |

FOREIGN PATENTS

| | | |
|---|---|---|
| 575,301 | 5/59 | Canada. |

DAVID G. REDINBAUGH, *Primary Examiner.*

HARRY GAUSS, SAMUEL B. PRITCHARD, *Examiners.*